(12) United States Patent
Coffing et al.

(10) Patent No.: US 9,886,265 B2
(45) Date of Patent: *Feb. 6, 2018

(54) LIVE UPDATING OF A CHANGED BLOCK TRACKING DRIVER

(71) Applicant: STORAGECRAFT TECHNOLOGY CORPORATION, Draper, UT (US)

(72) Inventors: Charles Coffing, Riverton, UT (US); Kai Meyer, Lehi, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/492,974

(22) Filed: Apr. 20, 2017

(65) Prior Publication Data

US 2017/0269928 A1    Sep. 21, 2017

Related U.S. Application Data

(63) Continuation of application No. 15/074,598, filed on Mar. 18, 2016, now Pat. No. 9,678,685.

(51) Int. Cl.
G06F 3/06 (2006.01)
G06F 9/445 (2006.01)
G06F 11/14 (2006.01)

(52) U.S. Cl.
CPC .......... *G06F 8/67* (2013.01); *G06F 3/064* (2013.01); *G06F 3/0619* (2013.01); *G06F 3/0659* (2013.01); *G06F 3/0673* (2013.01); *G06F 11/1451* (2013.01); *G06F 11/1464* (2013.01); *G06F 11/1469* (2013.01)

(58) Field of Classification Search
None
See application file for complete search history.

(56) References Cited

U.S. PATENT DOCUMENTS

| 7,784,044 B2* | 8/2010 | Buban | G06F 8/67 717/168 |
| 7,793,279 B1* | 9/2010 | Le | G06F 9/4411 717/168 |
| 2004/0098714 A1* | 5/2004 | Metz | G06F 9/4411 717/168 |

(Continued)

OTHER PUBLICATIONS

Swift, Michael M., et al. "Live update for device drivers." University of Wisconsin, Computer Sciences Technical Report CS-TR-2008-1634 (2008).*

*Primary Examiner* — Charles Rones
*Assistant Examiner* — Hewy Li
(74) *Attorney, Agent, or Firm* — Maschoff Brennan (57) ABSTRACT

Live updating of a changed block tracking (CBT) driver. In one example embodiment, a method for live updating of a CBT driver may include loading a CBT driver into a running operating system and then performing various acts without rebooting the running operating system. These acts may include tracking, using the CBT driver, writes to blocks of a source storage, loading an updated CBT driver into the running operating system with the updated CBT driver having a different name than the CBT driver, handing over the tracking of writes to blocks of the source storage from the CBT driver to the updated CBT driver, and tracking, using the updated CBT driver, writes to blocks of the source storage.

16 Claims, 6 Drawing Sheets (56) References Cited

U.S. PATENT DOCUMENTS

2011/0088027 A1* 4/2011 Jelvis ................... G06F 9/4411
717/174
2012/0324436 A1* 12/2012 Milenovic ................ G06F 8/67
717/170

* cited by examiner

LIVE UPDATING OF A CHANGED BLOCK TRACKING DRIVER

CROSS-REFERENCE TO A RELATED APPLICATION

This application is a continuation of U.S. patent application Ser. No. 15/074,598, filed Mar. 18, 2016, which is incorporated herein by reference in its entirety.

FIELD

The embodiments disclosed herein relate to live updating of a changed block tracking (CBT) driver.

BACKGROUND

A storage is computer-readable media capable of storing data in blocks. Storages face a myriad of threats to the data they store and to their smooth and continuous operation. In order to mitigate these threats, a backup of the data in a storage may be created to represent the state of the source storage at a particular point in time and to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

One way to accomplish image backup is using a snapshot, which enables the state of the source storage at a particular point in time to be captured without interrupting other processes, thus avoiding downtime of the source storage. Many snapshots employ a "copy on write" methodology which requires that every write command, received by the source storage while a snapshot is active, be delayed until the original data block at the location targeted by the write command is copied for safekeeping to a new location. In this manner, the copied original blocks stored in the new location, as well as the unchanged original blocks stored in the source storage, are "frozen" at the snapshot time and define the "snapshot," which can then be employed in the creation of an image backup of the source storage. Then, once the image backup has been created, the snapshot can be deactivated and the data blocks that were copied as part of the snapshot can be discarded.

A source storage may be initially backed up using an image backup operation to create a full image backup and then, in successive image backup operations, incremental image backups of the source storage may be created. A new incremental image backup may include only those blocks of the source storage that were changed between the snapshot time of the most recent image backup (whether full or incremental) and the snapshot time of the new incremental image backup. In order to easily back up only changed blocks during the creation of an incremental image backup, it can be useful to incrementally track which blocks are changed between snapshot times instead of determining which blocks are changed by performing a costly full compare of every block in the source storage with corresponding blocks in a full image backup and any incremental image backups that were previously created.

One common problem that is encountered during successive image backup operations is the difficulty of reliably tracking incremental changes between snapshot times. For example, incremental changes are typically tracked in a data structure stored in volatile memory using a driver. Over time, reliable tracking of incremental changes may require an update to the driver, which typically involves unloading the driver during the shutdown of an operating system and the subsequent loading of an updated driver upon rebooting the operating system, which may ensure that no blocks are changed by the operating system between the unloading of the driver and the loading of the updated driver. While this shutdown and reboot procedure may be a reliable way to update a driver while reliably tracking incremental changes, it has the distinct disadvantage of forcing an otherwise unnecessary reboot of the operating system, as well as the downtime of the operating system between the shutdown and the reboot, which for certain operating systems, such as those running on critical servers, may be unacceptable.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to live updating of a changed block tracking (CBT) driver. The example embodiments disclosed herein may be employed to update a CBT driver that has been loaded into a running operating system while reliably tracking incremental changes and without rebooting or otherwise interrupting the I/O of the operating system (i.e., the update is performed while the operating system is "live"), which avoids downtime of the operating system that would have resulted from a reboot or other I/O interruption of the operating system.

In one example embodiment, a method for live updating of a CBT driver may include loading a CBT driver into a running operating system and then performing various steps without rebooting the running operating system. These steps may include tracking, using the CBT driver, writes to blocks of a source, loading an updated CBT driver into the running operating system with the updated CBT driver having a different name than the CBT driver, handing over the tracking of writes to blocks of the source storage from the CBT driver to the updated CBT driver, and tracking, using the updated CBT driver, writes to blocks of the source storage.

In another example embodiment, a method for live updating of a CBT driver may include loading a CBT driver into a running operating system and then performing various steps without rebooting the running operating system. These steps may include tracking, using the CBT driver, writes to blocks of a source storage, loading an intermediate CBT driver into the running operating system with the intermediate CBT driver having a different name than the CBT driver, handing over the tracking of writes to blocks of the source storage from the CBT driver to the intermediate CBT driver, tracking, using the intermediate CBT driver, writes to blocks of the source storage, unloading the CBT driver from the running operating system, loading an updated CBT driver into the running operating system with the updated CBT driver having a different name than the intermediate CBT driver but the same name as the CBT driver, handing over the tracking of writes to blocks of the source storage from the intermediate CBT driver to the updated CBT driver, and tracking, using the updated CBT driver, writes to blocks of the source storage.

It is to be understood that both the foregoing general description and the following detailed description are explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

The term "storage" as used herein refers to computer-readable media capable of storing data in blocks, such as one or more floppy disks, optical disks, magnetic disks, or solid state (flash) disks, or some logical portion thereof such as a volume. The term "block" as used herein refers to a fixed-length discrete sequence of bits. In some file systems, blocks are sometimes referred to as "clusters." In some example embodiments, the size of each block may be configured to match the standard sector size of a storage on which the block is stored. For example, the size of each block may be 512 bytes (4096 bits) where 512 bytes is the size of a standard sector. In other example embodiments, the size of each block may be configured to be a multiple of the standard sector size of a storage on which the block is stored. For example, the size of each block may be 4096 bytes (32,768 bits) where 512 bytes (4096 bits) is the size of a standard sector, which results in each block including eight sectors. In some file systems, a block is the allocation unit of the file system, with the allocated blocks and free blocks being tracked by the file system. The term "allocated block" as used herein refers to a block in a storage that is currently tracked as storing data by a file system of the storage. The term "free block" as used herein refers to a block in a storage that is not currently tracked as storing data by a file system of the storage. The term "backup" when used herein as a noun refers to a copy or copies of one or more blocks from a storage. The term "full image backup" as used herein refers to a full image backup of a storage that includes at least a copy of each unique allocated block of the storage at a point in time such that the full image backup can be restored on its own to recreate the state of the storage at the point in time, without being dependent on any other backup. A "full image backup" may also include nonunique allocated blocks and free blocks of the storage at the point in time. An example file format for a "full image backup" is the ShadowProtect Full (SPF) image backup format. The term "incremental image backup" as used herein refers to an at least partial backup of a storage that includes at least a copy of each unique allocated block of the storage that was changed between a previous point in time of a previous backup of the storage and the subsequent point in time of the incremental image backup, such that the incremental image backup, along with all previous backups of the storage, including an initial full image backup of the storage, can be restored together as an incremental image backup chain to recreate the state of the storage at the subsequent point in time. An "incremental image backup" may also include nonunique allocated blocks and free blocks of the storage that were changed between the previous point in time and the subsequent point in time. An example file format for an "incremental image backup" is the ShadowProtect Incremental (SPI) image backup format. The term "changed block" as used herein refers to a block that was changed either because the block was previously allocated and changed or because the block was changed by being newly allocated and changed. The term "decremental image backup" as used herein refers to an at least partial backup of a storage that includes at least a copy of each unique allocated block from a full image backup of the storage that corresponds to a block that was changed in the source storage between a previous point in time and a subsequent point in time, such that the decremental image backup, along with all subsequent decremental image backups of the storage, including a full image backup of the storage, can be restored together as a decremental image backup chain to recreate the state of the storage at the previous point in time. A "decremental image backup" may also include nonunique allocated blocks and free blocks from a full image backup of the storage that correspond to blocks that were changed in the source storage between the point in time and the subsequent point in time. It is understood that a "full image backup," an "incremental image backup," and/or a "decremental image backup" may exclude certain undesired allocated blocks such as blocks belonging to files whose contents are not necessary for restoration purposes, such as virtual memory pagination files and machine hibernation state files.

Figure 1:
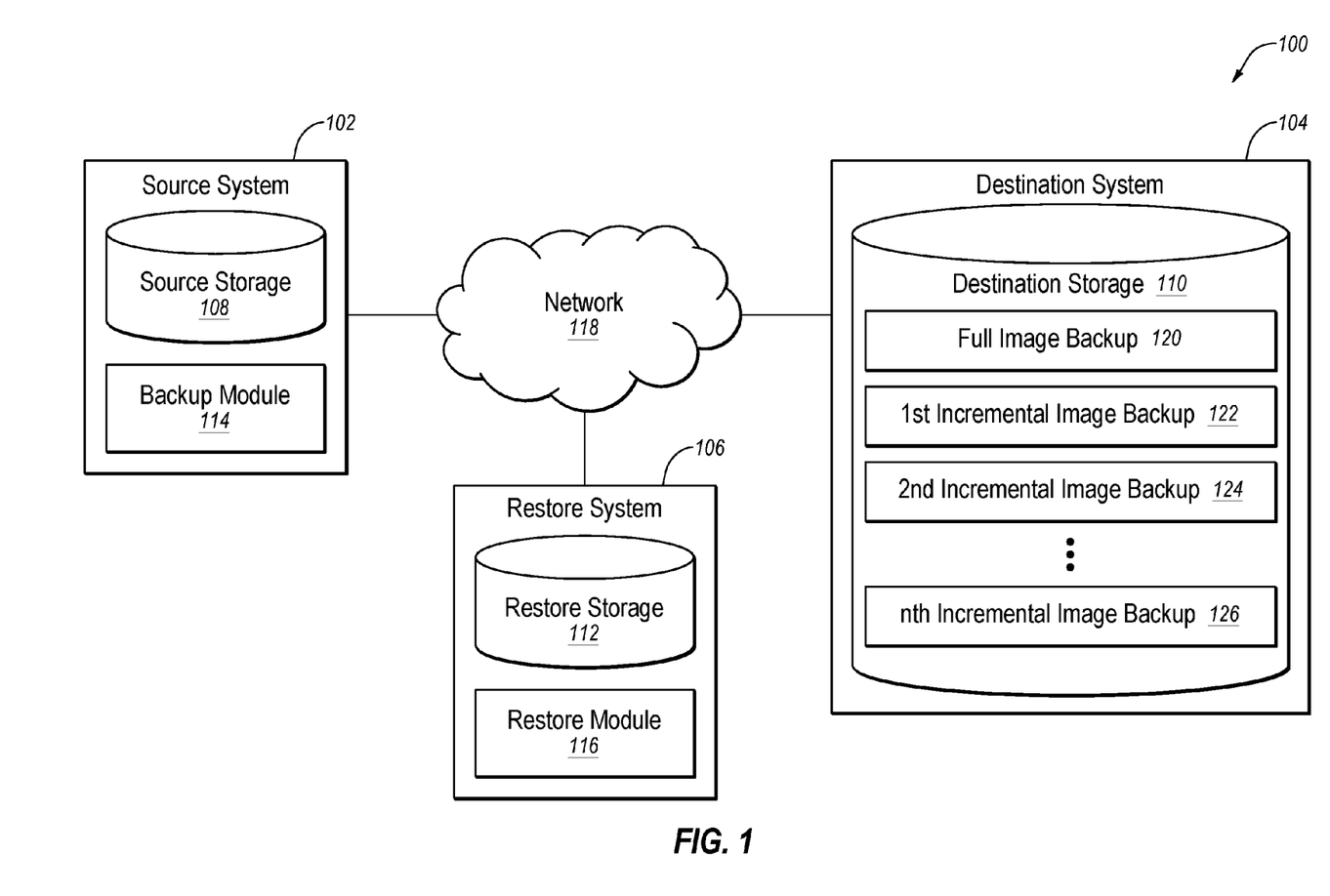
FIG. 1 is a schematic block diagram illustrating an example image backup and restore system.

FIG. 1 is a schematic block diagram illustrating an example image backup and restore system 100. As disclosed in FIG. 1, the system 100 may include a source system 102, a destination system 104, and a restore system 106. The systems 102, 104, and 106 may include storages 108, 110, and 112, respectively. The source system 102 may also include a backup module 114 and the restore system 106 may also include a restore module 116. The systems 102, 104, and 106 may be configured to communicate with one another over a network 118.

The destination storage 110 may store one or more image backups of the source storage 108. For example, the destination storage 110 may store a full image backup 120, a 1st incremental image backup 122, a 2nd incremental image backup 124, and an nth incremental image backup 126, which together make up an incremental image backup chain. The full image backup 120 may represent the state of the source storage at time t(1), the 1st incremental image backup 122 may represent the state of the source storage at time t(2), the 2nd incremental image backup 124 may represent the state of the source storage at time t(3), and the nth incremental image backup 126 may represent the state of the source storage at time t(n+1). Any of the image backups 120-126 may be restored to the restore storage 112.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines. The network 118 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof. The network 118 may also be a network emulation of a hypervisor over which one or more virtual machines and/or physical machines may communicate.

The incremental image backup chain stored in the destination storage 110 may be created by the backup module 114. For example, the backup module 114 may be one or more programs that are configured, when executed, to cause one or more processors to perform image backup operations of creating a full image backup and multiple incremental image backups of the source storage 108. It is noted that these image backups may initially be created on the source system 102 and then copied to the destination system 104.

For example, the full image backup 120 may be created to capture the state at time t(1). This image backup operation may include the backup module 114 copying all unique allocated blocks of the source storage 108 as allocated at time t(1) and storing the unique allocated blocks in the destination storage 110, or verifying that the unique allocated blocks are already stored in the destination storage 110. The state of the source storage 108 at time t(1) may be captured using a snapshot in order to capture the blocks stored in the source storage 108 at time t(1) without interrupting other processes, thus avoiding downtime of the source storage 108. The full image backup 120 may be relatively large depending on the size of the source storage 108 and the number of allocated blocks at time t(1). As a result, the full image backup 120 may take a relatively long time to create and consume a relatively large amount of space in the destination storage 110.

Next, the 1st and 2nd incremental image backups 122 and 124 may be created to capture the states at times t(2) and t(3), respectively. This may include copying only changed unique allocated blocks of the source storage 108 present at time t(2) and storing the changed unique allocated blocks in the destination storage 110, or verifying that the changed unique allocated blocks are already stored in the destination storage 110, then later copying only changed unique allocated blocks of the source storage 108 present at time t(3) and storing the changed unique allocated blocks in the destination storage 110, or verifying that the changed unique allocated blocks are already stored in the destination storage 110. The states of the source storage 108 at times t(2) and t(3) may also be captured using a snapshot, thus avoiding downtime of the source storage 108. Each incremental image backup may include only those unique allocated blocks from the source storage 108 that were changed after the time of the previous image backup. Thus, the 1st incremental image backup 122 may include only those unique allocated blocks from the source storage 108 that were changed between time t(1) and time t(2), and the 2nd incremental image backup 124 may include only those unique allocated blocks from the source storage 108 that were changed between time t(2) and time t(3). In general, as compared to the full image backup 120, each incremental image backup may take a relatively short time to create and consume a relatively small storage space in the destination storage 110.

Finally, the nth incremental image backup 126 may be created to capture the state at time t(n+1). This may include copying only changed unique allocated blocks of the source storage 108 present at time t(n+1) using a snapshot, and storing the changed unique allocated blocks in the destination storage 110, or verifying that the changed unique allocated blocks are already stored in the destination storage 110. The nth incremental image backup 126 may include only those unique allocated blocks from the source storage 108 that were changed between time t(n) and time t(n+1).

Therefore, incremental image backups may be created on an ongoing basis. The frequency of creating new incremental image backups may be altered as desired in order to adjust the amount of data that will be lost should the source storage 108 experience corruption of its stored blocks or become unavailable at any given point in time. The blocks from the source storage 108 can be restored to the state at the point in time of a particular incremental image backup by applying the image backups to the restore storage 112 from oldest to newest, namely, first applying the full image backup 120 and then applying each successive incremental image backup up to the particular incremental image backup. Alternatively, the blocks from the source storage 108 can be restored to the state at the point in time of a particular incremental image backup by applying the image backups to the restore storage 112 concurrently, namely, concurrently applying the full image backup 120 and each successive incremental image backup up to the particular incremental image backup.

Although only allocated blocks are included in the example incremental image backups discussed above, it is understood that in alternative implementations both allocated and free blocks may be backed up during the creation of a full image backup or an incremental image backup. This is typically done for forensic purposes, because the contents of free blocks can be interesting where the free blocks contain data from a previous point in time when the blocks were in use and allocated. Therefore, the creation of full image backups and incremental image backups as disclosed herein is not limited to allocated blocks but may also include free blocks.

Further, although only full image backups and incremental image backups are discussed above, it is understood that the source storage 108 may instead be backed up by creating a full image backup and one or more decremental image backups. Decremental image backups are created by initially creating a full image backup to capture the state at an initial point in time, then updating the full image backup to capture the state at a subsequent point in time by modifying only those blocks in the full image backup that were changed between the initial and subsequent points in time. Prior to the updating of the full image backup, however, any original blocks in the full image backup that correspond to the locations of the changed blocks are copied to a decremental image backup, thus enabling restoration of the source storage 108 at the initial point in time (by restoring the updated full image backup and then restoring the decremental image backup, or by concurrently restoring the updated full image backup and the decremental image backup) or at the subsequent point in time (by simply restoring the updated full image backup). Since restoring a single full image backup is generally faster than restoring a full image backup and one or more incremental or decremental image backups, creating decremental image backups instead of incremental image backups may enable the most recent image backup to be restored more quickly since the most recent image backup is always a full image backup instead of potentially being an incremental image backup. Therefore, the methods disclosed herein are not limited to implementation on incremental image backup chains, but may also include implementation on decremental image backup chains.

In one example embodiment, the destination system 104 may be a network server, the source system 102 may be a first desktop computer, the source storage 108 may be a volume on one or more magnetic hard drives of the first desktop computer, the restore system 106 may be a second desktop computer, the restore storage 112 may be a volume on one or more magnetic hard drives of the second desktop computer, and the network 118 may include the internet. In this example embodiment, the first desktop computer may be configured to periodically back up the volume of the first desktop computer over the internet to the network server as part of a backup job by creating the full image backup 120 and the multiple incremental image backups 122, 124, and 126 stored in the destination storage 110. The first desktop computer may also be configured to track incremental changes to its volume between backups in order to easily and quickly identify only those blocks that were changed for use in the creation of an incremental image backup. The second desktop computer may also be configured to restore one or more of the image backups from the network server over the internet to the volume of the second desktop computer if the first desktop computer experiences corruption of its volume or if the first desktop computer's volume becomes unavailable.

Although only a single storage is disclosed in each of the systems 102, 104, and 106 in FIG. 1, it is understood that any of the systems 102, 104, and 106 may instead include two or more storages. Further, although the systems 102, 104, and 106 are disclosed in FIG. 1 as communicating over the network 118, it is understood that the systems 102, 104, and 106 may instead communicate directly with each other. For example, in some embodiments any combination of the systems 102, 104, and 106 may be combined into a single system, including embodiments where the source storage 108 represents the same storage as the restore storage 112. Further, although the backup module 114 and the restore module 116 are the only modules disclosed in the system 100 of FIG. 1, it is understood that the functionality of the modules 114 and 116 may be replaced or augmented by one or more similar modules residing on any of the systems 102, 104, or 106 or another system. Finally, although only a single source storage and a single restore storage are disclosed in the system 100 of FIG. 1, it is understood that the destination system 104 of FIG. 1 may be configured to simultaneously back up multiple source storages and/or to simultaneously restore to multiple restore storages. For example, where the destination system 104 is configured as a deduplication system (that is capable of removing duplicate blocks within image backups and/or is capable of removing duplicate blocks between image backups), the greater the number of storages that are backed up to the destination storage 110 of the destination system 104, the greater the likelihood for reducing redundancy and for reducing the overall number of blocks being backed up, resulting in corresponding decreases in the overall size requirements of the destination storage 110 and in the bandwidth overhead of transporting blocks to the destination storage 110.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2:
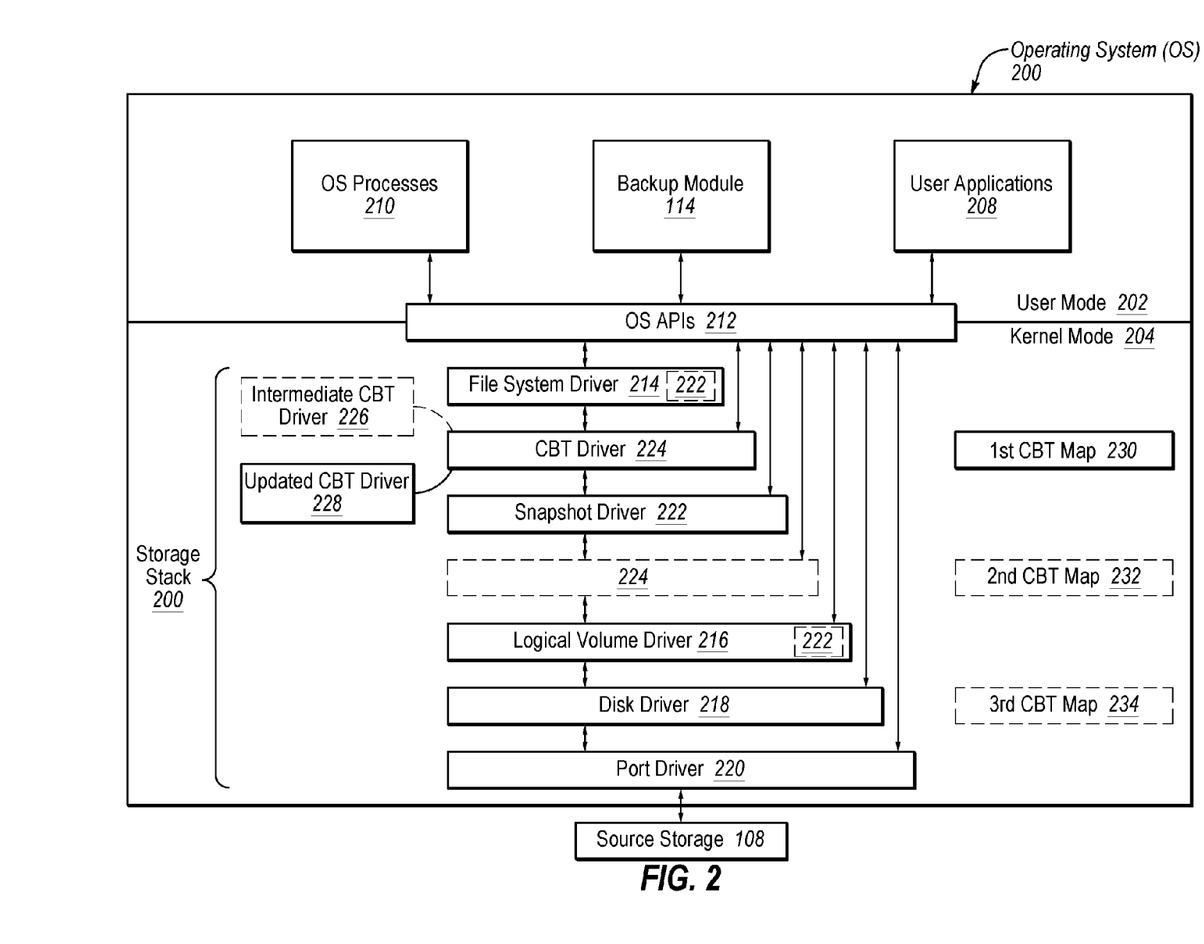
FIG. 2 is a schematic block diagram of an operating system of a source system of FIG. 1.

FIG. 2 is a schematic block diagram of an operating system (OS) 200 of the source system 102 of FIG. 1. As disclosed in FIG. 2, the OS 200 may be a standard operating system, such as a standard Linux or Windows operating system, and may be generally divided between a user mode 202 and a kernel mode 204. The user mode 202 includes OS processes 210 and user applications 208 configured for operation with the OS 200. The OS 200 may also include OS Application Program Interfaces (APIs) 212 for providing functionality to, and a general interface between, modules in the user mode 202 and the kernel mode 204.

The kernel mode 204 includes lower level operating system modules, such as a file system driver 214, a logical volume driver 216, and device drivers for the various hardware devices in the source system 102. Modules within the OS 200, including components in the user mode 202 and the kernel mode 204, or any other component that is capable of interacting with the OS APIs 212, can make use of the OS APIs 212 to initiate Input/Output (I/O) requests which may take the form of read requests and write requests (also referred to as reads and writes) to the file system driver 214. The OS modules which handle file I/O requests generally form a storage stack 206.

The file system driver 214 passes these I/O requests on to the logical volume driver 216 to determine what disk(s), and what sector(s) on the disk(s), should be accessed to perform the I/O requests. The logical volume driver 216 then passes these I/O requests with disk-specific information, such as disk sector location(s), to a disk driver 218. Disk requests, which may be local or remote, are made to a port driver 220 that converts the disk request into the necessary hardware controls to retrieve or store the desired data on the source storage 108. The source storage 108 may include multiple logical volumes on different partitions of a disk or disks.

The user mode 202 may also include the backup module 114 which, as noted above, may be configured to perform image backup operations of creating a full image backup and multiple incremental image backups of the source storage 108. Also noted above, the backup module 114 may be configured to utilize snapshot technology that may be implemented by a snapshot driver 222, which may sit between the file system driver 214 and the logical volume driver 216, may be part of the file system driver 214, may be part of the logical volume driver 216, or may be implemented as some combination of these alternatives, as disclosed in FIG. 2.

The backup module 114 may also be configured to employ a changed block tracking (CBT) driver 224 to incrementally track which blocks are changed in the source storage 108 between two snapshot times, instead of determining which blocks are changed by performing a full compare of every block in the source storage 108 at the second snapshot time with corresponding blocks in base and incremental image backups that correspond to the first snapshot time. The CBT driver 224 may sit, for example, between the file system driver 214 and the logical volume driver 216, either above or below the snapshot driver 222, as disclosed in FIG. 2.

Over time, reliable tracking of changed blocks may require an update to the CBT driver 224. Updating the CBT driver 224 could be accomplished by unloading the CBT driver 224 during the shutdown of the OS 200 and the subsequent loading of an updated CBT driver 228 upon rebooting of the OS 200. This shutdown and reboot procedure may be employed in order to avoid missing the tracking of any writes to the source storage 108 where the OS 200 does not allow two drivers having the same name to be running simultaneously. While this shutdown and reboot procedure may be a reliable way to update the CBT driver 224, it has the distinct disadvantage of forcing an otherwise unnecessary reboot or other interruption of the I/O of the OS 200, as well as the downtime of the OS 200 between the shutdown and the reboot, which may be unacceptable where it is critical that downtime be minimized or avoided for the source system 102.

Therefore, the example methods disclosed herein may be employed to update the CBT driver 224 after having been loaded into the running OS 200 while reliably tracking incremental changes and without rebooting or otherwise interrupting the I/O of the OS 200 (i.e., the update is performed while the OS 200 is "live"), which avoids downtime of the OS 200 that would have resulted from a reboot or other interruption of the I/O of the OS 200. The updating of the CBT driver 224 may involve the loading of the updated CBT driver 228 and also optionally the loading of an intermediate CBT driver 226, as discussed below in connection with FIGS. 3A, 3B, 4A, and 4B. It is understood that the updated CBT driver 228 may be either a newer version of the CBT driver 224 (i.e., an upgrade to the CBT driver 224) or an older version of the CBT driver 224 (i.e., a rollback of the CBT driver 224).

Figure 3A:
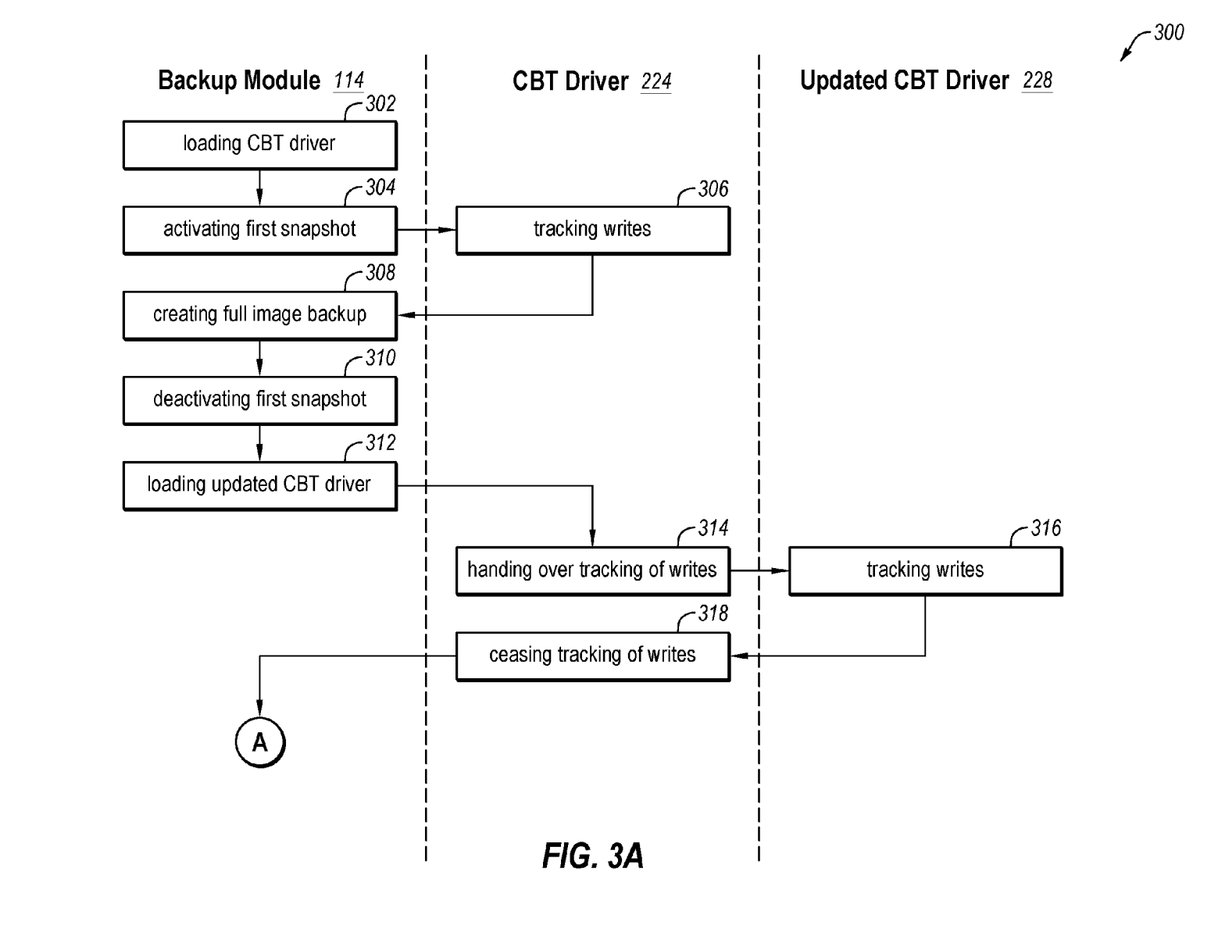
FIGS. 3A and 3B are a schematic flowchart illustrating an example method for live updating of a changed block tracking (CBT) driver.
Figure 3B:
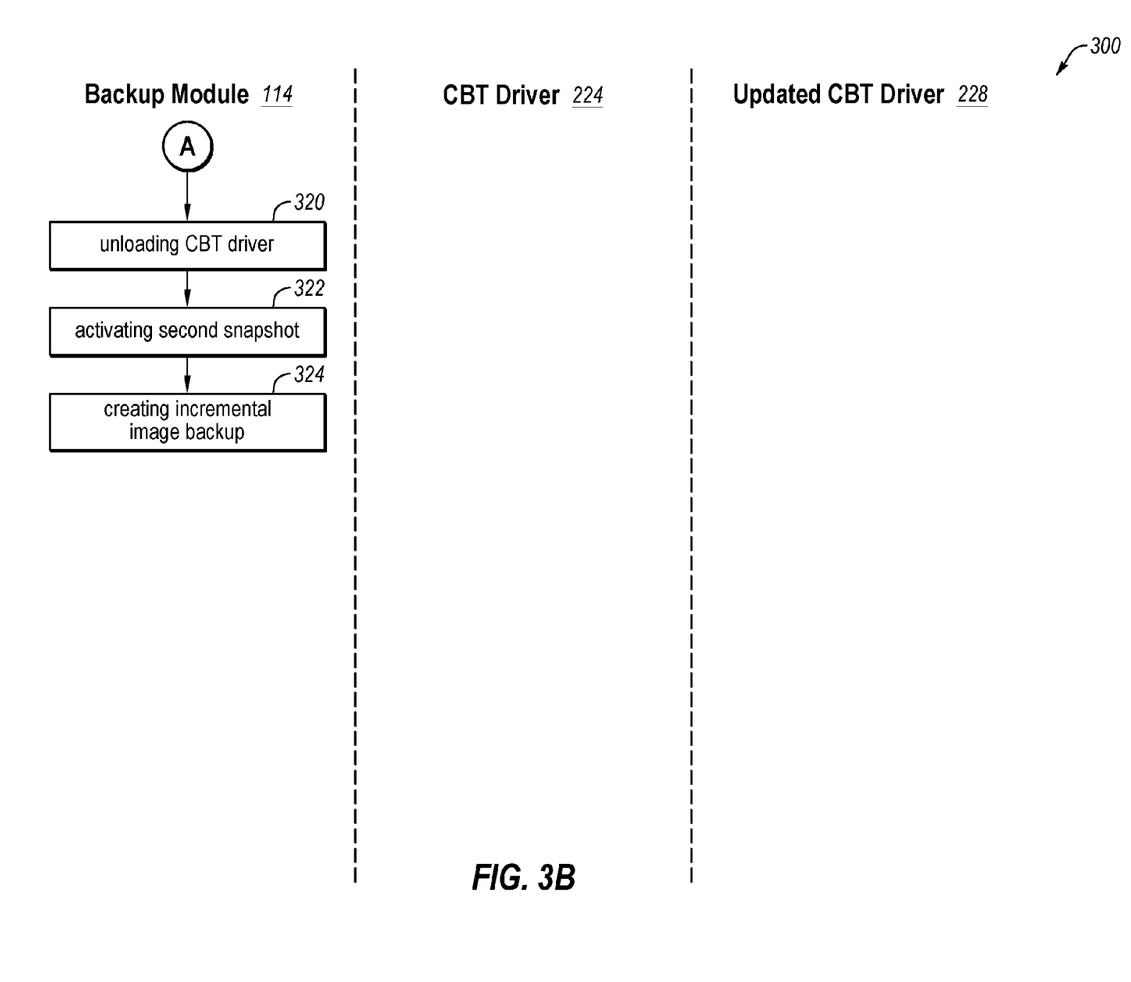
Figure 4A:
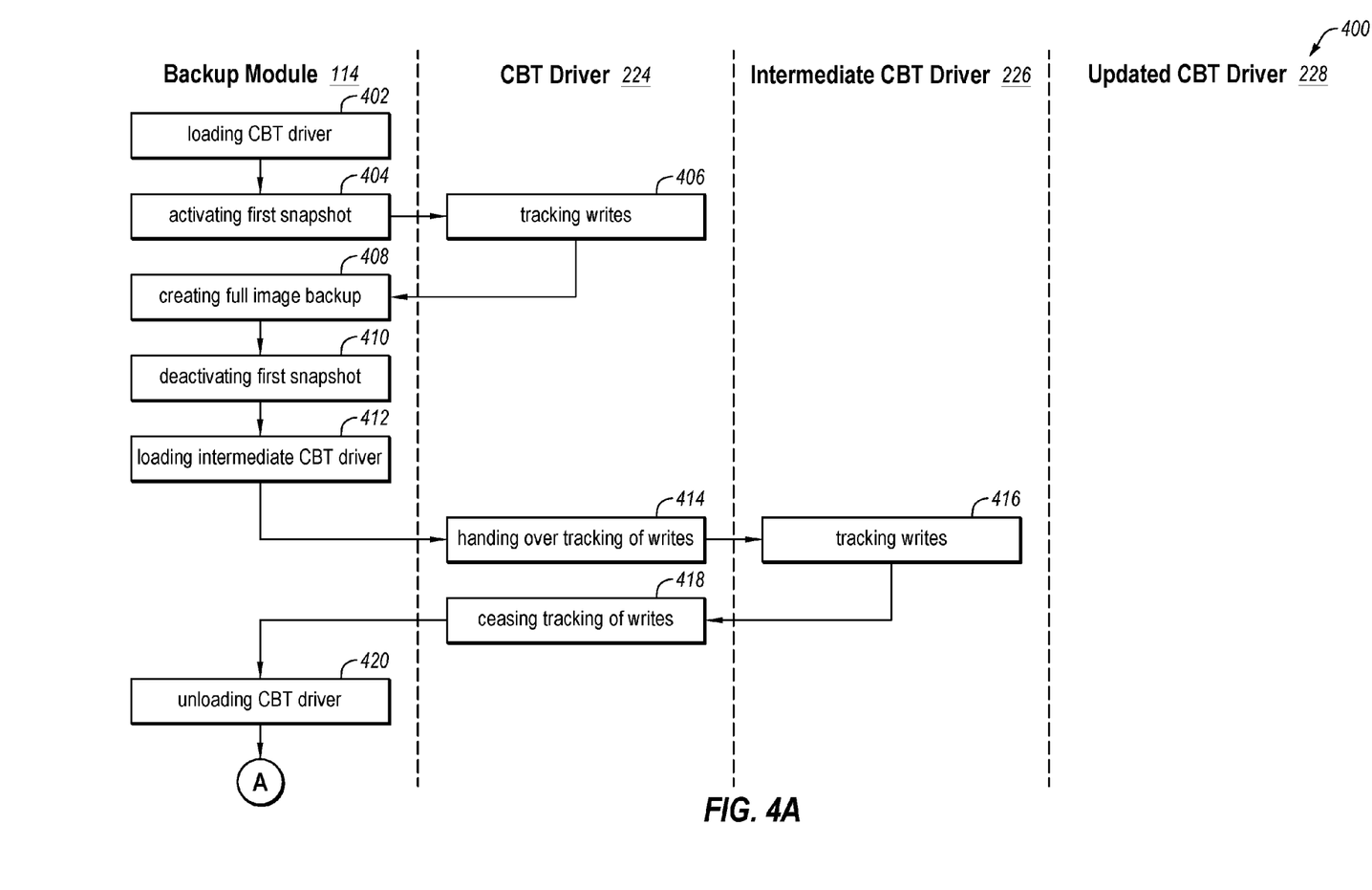
FIGS. 4A and 4B are a schematic flowchart illustrating another example method for live updating of a CBT driver.
Figure 4B:
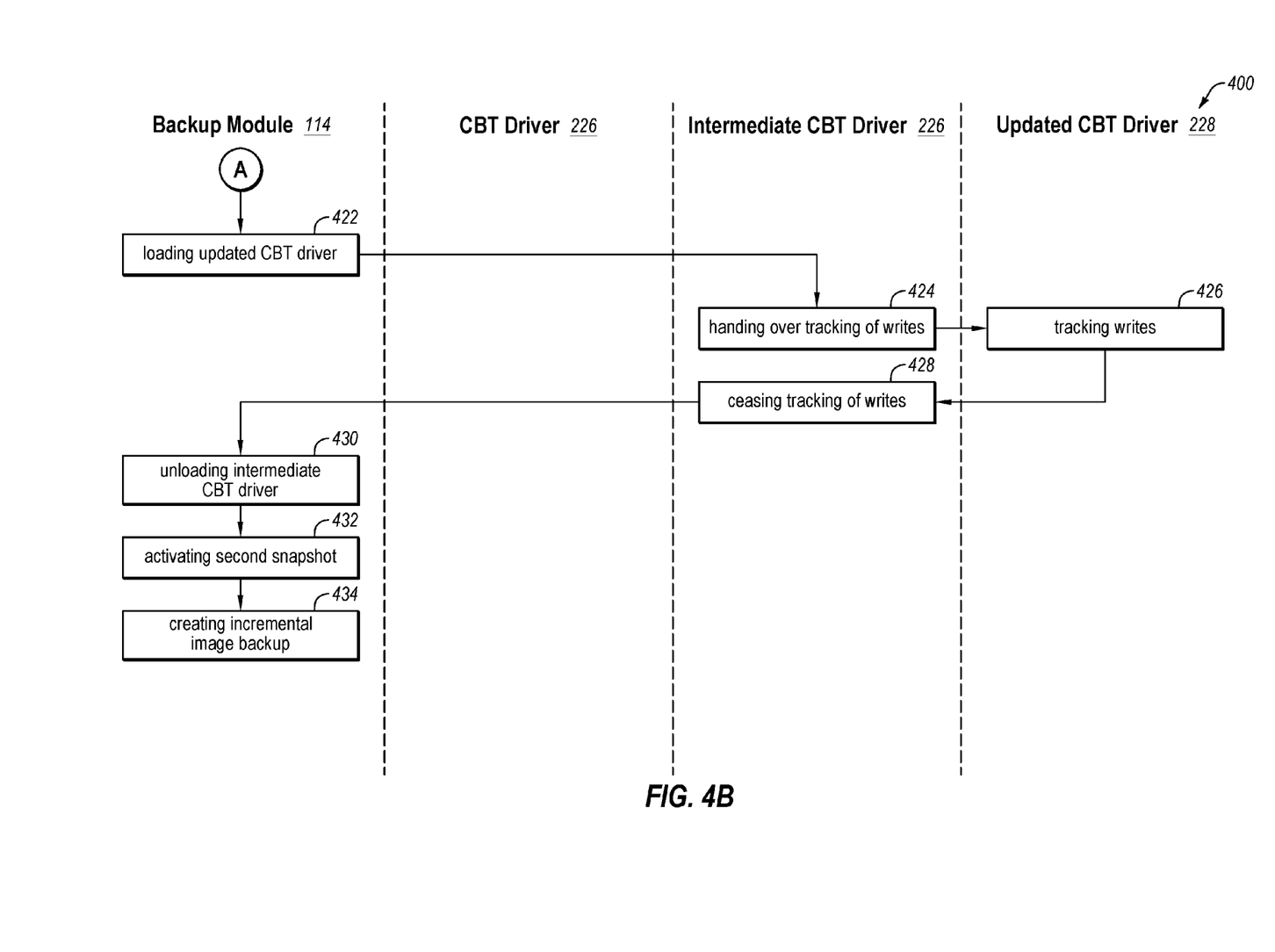

FIGS. 3A and 3B are a schematic flowchart illustrating an example method 300 for live updating of a CBT driver. FIGS. 4A and 4B are a schematic flowchart illustrating another example method 400 for live updating of a CBT driver 224. The methods 300 and 400 may be implemented, in at least some embodiments, by one or more of the backup module 114, the CBT driver 224, the intermediate CBT driver 226, and the updated CBT driver 228 of FIG. 2. For example, the backup module 114, the CBT driver 224, the intermediate CBT driver 226, and the updated CBT driver 228 may each be one or more programs, stored on one or more non-transitory computer-readable media, that are configured, when executed, to cause one or more processors to perform operations of the methods 300 and 400, as represented by one or more of the steps of the methods 300 and 400. Although illustrated as discrete steps, various steps may be divided into additional steps, combined into fewer steps, reordered, or eliminated, depending on the desired implementation. The method 300 will be discussed with reference to FIGS. 1, 2, and 3. The method 400 will be discussed with reference to FIGS. 1, 2, and 4.

The method 300 of FIGS. 3A and 3B may include step 302 of loading a CBT driver into a running operating system. For example, the backup module 114 may load, at step 302, the CBT driver 224 into the running OS 200, as disclosed in FIG. 2. The loading at step 302 may occur, for example, upon booting of the OS 200.

The method 300 of FIGS. 3A and 3B may include step 304 of activating a first snapshot of a source storage. For example, the backup module 114 may activate, at step 304, a first snapshot of the source storage 108 using the snapshot driver 222, as disclosed in FIG. 2.

The method 300 of FIGS. 3A and 3B may include step 306 of tracking, using the CBT driver, writes to blocks of the source storage between a first snapshot time of a first snapshot of the source storage and a second snapshot time of a second snapshot of the source storage. For example, the CBT driver 224 may track, at step 306, writes to blocks of the source storage 108 between a first snapshot time of the first snapshot of the source storage 108 (that was activated at step 304) and a second snapshot time of a second snapshot of the source storage 108 (for example, the second snapshot that is activated at step 322, as discussed below), as disclosed in FIG. 2. It is understood that the tracking at step 306 may begin at the snapshot time of the first snapshot that was activated at step 304 in order to track all writes to blocks of the source storage 108 that occur subsequent to the first snapshot time.

The tracking at step 306 may be accomplished using a first CBT map 230, as disclosed in FIG. 2. The first CBT map 230 may be implemented, for example, as a bitmap where each bit corresponds to a block in the source storage 108, with the bit being set to "1" to represent a changed block and the bit being set to "0" to represent an unchanged block, or vice versa. Alternatively, the first CBT map 230 may be implemented, for example, as a run-length encoded list of bits corresponding to the blocks in the source storage 108. At the first snapshot time, the first CBT map 230 may be initialized to indicate that no blocks in the source storage 108 are changed. Then, as writes are executed on the source storage 108, the blocks in the source storage 108 that are written to may be tracked as changed in the first CBT map 230.

The method 300 of FIGS. 3A and 3B may include step 308 of creating a full image backup of the source storage using the first snapshot by backing up all allocated blocks in the first snapshot. For example, the backup module 114 may create, at step 308, the full image backup 120 of the source storage 108 using the first snapshot by backing up all allocated blocks in the first snapshot, as disclosed in FIG. 1.

The method 300 of FIGS. 3A and 3B may include step 310 of deactivating the first snapshot of the source storage. For example, the backup module 114 may deactivate, at step 310, the first snapshot of the source storage 108 using the snapshot driver 222, as disclosed in FIG. 2.

The method 300 of FIGS. 3A and 3B may include step 312 of loading an updated CBT driver into the running operating system. For example, the backup module 114 may load the updated CBT driver 228 into the running OS 200, as disclosed in FIG. 2. The loading at step 312 may occur, for example, without rebooting or otherwise interrupting the I/O of the OS 200. This loading of the updated CBT driver 228 while the CBT driver 224 is still running may be possible, even where the OS 200 does not allow two drivers having the same name to be running simultaneously, due to the updated CBT driver 228 having a different name than the CBT driver 224.

The method 300 of FIGS. 3A and 3B may include step 314 of handing over the tracking of writes to blocks of the source storage from the CBT driver to the updated CBT driver at a handover time. For example, the CBT driver 224 may hand over, at step 314, the tracking of writes to blocks of the source storage 108 from the CBT driver 224 to the updated CBT driver 228 at a handover time, as disclosed in FIG. 2.

The method 300 of FIGS. 3A and 3B may include step 316 of tracking, using the updated CBT driver, writes to blocks of the source storage between the handover time and the second snapshot time. For example, the updated CBT driver 228 may, at step 316, track writes to blocks of the source storage 108 between the handover time of step 314 and the second snapshot time of a second snapshot of the source storage 108 (for example, the second snapshot that is activated at step 322, as discussed below), as disclosed in FIG. 2. It is understood that the handing over at step 314 and/or the tracking at step 316 may each be at least partially performed as part of the loading at step 312.

The tracking at step 316 may be accomplished using the first CBT map 230 or using a second CBT map 232, as disclosed in FIG. 2. The second CBT map 232 may be implemented, for example, as a bitmap or as a run-length encoded list of bits. The structure of the second CBT map 232 may be the same as or different than a structure of the first CBT map 230.

Where the tracking at step 316 (or at step 416 discussed below) is accomplished using the first CBT map 230, the handing over of the tracking of writes at step 314 may include simply handing over of the first CBT map 230 from the CBT driver 224 to the updated CBT driver 228. Alternatively, where the tracking at step 316 (or at step 416 discussed below) is accomplished using the second CBT map 232, the handing over of the tracking of writes at step 314 may include copying the tracking included in the first CBT map 230 to the second CBT map 232. For example, where the first CBT map 230 and the second CBT map 232 are bitmaps with a bit being set to "1" to represent a changed block, this copying may involve performing a Boolean OR operation on the first CBT map 230 and the second CBT map 232 and storing the result of the Boolean OR operation in the second CBT map 232.

The method 300 of FIGS. 3A and 3B may include step 318 of ceasing tracking, using the CBT driver, of writes to blocks of the source storage. For example, the CBT driver 224 may cease tracking of writes to blocks of the source storage 108. This ceasing of tracking by the CBT driver 224 may occur once the tracking of writes by the updated CBT driver 228 begins. The ceasing of the tracking using the CBT driver 224 and the beginning of the tracking using the updated CBT driver 228 may be implemented by updating a function pointer, such as an I/O function pointer in the backup module 114, the OS APIs 212, or the file system driver 214. Alternatively, the tracking of writes by the CBT driver 224 may overlap with the tracking of writes by the updated CBT driver 228, resulting in the ceasing of tracking at step 318 happening sometime after the beginning of the tracking of writes by the updated CBT driver 228.

The method 300 of FIGS. 3A and 3B may include step 320 of unloading the CBT driver from the running operating system. For example, the backup module 114 may unload, at step 320, the CBT driver 224 from the running OS 200, as disclosed in FIG. 2. The unloading at step 320 may occur, for example, without rebooting or otherwise interrupting the I/O of the OS 200.

The method 300 of FIGS. 3A and 3B may include step 322 of activating a second snapshot of the source storage. For example, the backup module 114 may activate, at step 322, a second snapshot of the source storage 108 using the snapshot driver 222, as disclosed in FIG. 2.

The method 300 of FIGS. 3A and 3B may include step 324 of creating an incremental image backup of the source storage using the second snapshot by backing up only those blocks in the second snapshot that were tracked as changed blocks by the CBT driver and the updated CBT driver (and in the case of step 434 discussed below, by an intermediate CBT driver) between the first snapshot time and the second snapshot time. For example, the backup module 114 may create, at step 324, the 1st incremental image backup 122 of the source storage 108 using the second snapshot, as disclosed in FIG. 1, by backing up only those blocks in the second snapshot that were tracked as changed blocks by the CBT driver 224 and by the updated CBT driver 228 (and, in the case of step 434 discussed below, by the intermediate CBT driver 226) between the first snapshot time and the second snapshot time, as disclosed in FIG. 2.

Therefore, the example method 300 disclosed herein may be employed to update the CBT driver 224 after having been loaded into the running OS 200 while reliably tracking incremental changes and without rebooting or otherwise interrupting the I/O of the OS 200, which avoids downtime of the OS 200 that would have resulted from a reboot or other interruption of the I/O of the OS 200. It is understood that the foregoing discussion of the method 300 is but one possible implementation of a method for live updating of a CBT driver, and various modifications are possible and contemplated. For example, the method 300 may be modified to remove one or more of steps 304, 308, 310, 318, 320, 322, and 324.

The method 400 of FIGS. 4A and 4B may include steps 402, 404, 406, 408, 410, and 420 which are identical to steps 302, 304, 306, 308, 310, and 320, respectively, of the method 300 of FIGS. 3A and 3B. Further, the method 400 of FIGS. 4A and 4B may include steps 432 and 434 which are identical to steps 322 and 324, respectively, of the method 300 of FIGS. 3A and 3B.

The method 400 of FIGS. 4A and 4B may include step 412 of loading an intermediate CBT driver into the running operating system. For example, the backup module 114 may load, at step 412, the intermediate CBT driver 226 into the running OS 200, as disclosed in FIG. 2. The loading at step 412 may occur, for example, without rebooting or otherwise interrupting the I/O of the OS 200. This loading of the intermediate CBT driver 226 while the CBT driver 224 is still running may be possible even where the OS 200 does not allow two drivers having the same name to be running simultaneously, due to the intermediate CBT driver 226 having a different name than the CBT driver 224. It is understood that the intermediate CBT driver 226 may be simpler than the CBT driver 224, and may be simpler than the updated CBT driver 228, in terms of its functionality since by its very nature the intermediate CBT driver 226 will only be utilized temporarily for specific handover purposes between the unloading of the CBT driver 224 and the loading of the updated CBT driver 228.

The method 400 of FIGS. 4A and 4B may include step 414 of handing over the tracking of writes to blocks of the source storage from the CBT driver to the intermediate CBT driver at a first handover time. For example, the CBT driver 224 may hand over, at step 414, the tracking of writes to blocks of the source storage 108 from the CBT driver 224 to the intermediate CBT driver 226 at a first handover time, as disclosed in FIG. 2.

The method 400 of FIGS. 4A and 4B may include step 416 of tracking, using the intermediate CBT driver, writes to blocks of the source storage between the first handover time and the second snapshot time. For example, the intermediate CBT driver 226 may track, at step 416, writes to blocks of the source storage 108 between the first handover time of step 414 and the second snapshot time of a second snapshot of the source storage 108 (for example, the second snapshot that is activated at step 432, as discussed below), as disclosed in FIG. 2. It is understood that the handing over at step 414 and/or the tracking at step 416 may each be at least partially performed as part of the loading at step 412. The tracking at step 416 may be accomplished using the first CBT map 230 or using the second CBT map 232, as disclosed in FIG. 2.

The method 400 of FIGS. 4A and 4B may include step 418 of ceasing tracking, using the CBT driver, of writes to blocks of the source storage. For example, the CBT driver 224 may cease tracking, at step 418, of writes to blocks of the source storage 108, as disclosed in FIG. 2. This ceasing of tracking by the CBT driver 224 may occur once the tracking of writes by the intermediate CBT driver 226 begins. The ceasing of the tracking using the CBT driver 224 and the beginning of the tracking using the intermediate CBT driver 226 may be implemented by updating a function pointer, such as an I/O function pointer in the backup module 114, the OS APIs 212, or the file system driver 214. Alternatively, the tracking of writes by the CBT driver 224 may overlap with the tracking of writes by the intermediate CBT driver 226, resulting in the ceasing of tracking at step 418 happening sometime after the beginning of the tracking of writes by the intermediate CBT driver 226.

The method 400 of FIGS. 4A and 4B may include step 422 of loading an updated CBT driver into the running operating system. For example, the backup module 114 may load, at step 422, the updated CBT driver 228 into the running OS 200, as disclosed in FIG. 2. The loading at step 422 may occur, for example, without rebooting or otherwise interrupting the I/O of the OS 200. This loading of the updated CBT driver 228 may be possible even where the updated CBT driver 228 has the same name as the CBT driver 224 and even where the OS 200 does not allow two drivers having the same name to be running simultaneously, due to the intermediate CBT driver 226 having a different name than the CBT driver 224 and than the updated CBT driver 228, and due to the unloading of the CBT driver 224 at step 420 occurring prior to the loading of the updated CBT driver 228 at step 422.

The method 400 of FIGS. 4A and 4B may include step 424 of handing over the tracking of writes to blocks of the source storage from the intermediate CBT driver to the updated CBT driver at a second handover time. For example, the intermediate CBT driver 226 may hand over, at step 424, the tracking of writes to blocks of the source storage 108 from the intermediate CBT driver 226 to the updated CBT driver 228 at a second handover time, as disclosed in FIG. 2.

The method 400 of FIGS. 4A and 4B may include step 426 of tracking, using the updated CBT driver, writes to blocks of the source storage between the second handover time and the second snapshot time. For example, the updated CBT driver 228 may track, at step 426, writes to blocks of the source storage 108 between the second handover time at step 424 and the second snapshot time of a second snapshot of the source storage 108 (for example, the second snapshot that is activated at step 432, as discussed below), as disclosed in FIG. 2. It is understood that the handing over at step 424 and/or the tracking at step 426 may each be at least partially performed as part of the loading at step 422.

The tracking at step 426 may be accomplished using the first CBT map 230, the second CBT map 232, or using a third CBT map 234, as disclosed in FIG. 2. The third CBT map 234 may be implemented, for example, as a bitmap or as a run-length encoded list of bits. The structure of the third CBT map 234 may be the same as or different than a structure of the first CBT map 230 or a structure of the second CBT map 232.

Where the tracking at step 426 is accomplished using the first CBT map 230 or the second CBT map 232, the handing over of the tracking of writes at step 424 may include simply handing over of the first CBT map 230 or the second CBT map 232 from the intermediate CBT driver 226 to the updated CBT driver 228. Alternatively, where the tracking at step 426 is accomplished using the third CBT map 234, the handing over of the tracking of writes at step 424 may include copying the tracking included in the first CBT map 230 or the second CBT map 232 or both to the third CBT map 234. Where the first CBT map 230, the second CBT map 232, and the third CBT map 234 are bitmaps with a bit being set to "1" to represent a changed block, this copying may involve performing a Boolean OR operation on the first CBT map 230 or the second CBT map 232 or both and the third CBT map 234 and storing the result of the Boolean OR operation in the third CBT map 234.

The method 400 of FIGS. 4A and 4B may include step 428 of ceasing tracking, using the intermediate CBT driver, of writes to blocks of the source storage. For example, the intermediate CBT driver 226 may cease tracking of writes to blocks of the source storage 108, as disclosed in FIG. 2. This ceasing of tracking by the intermediate CBT driver 226 may occur once the tracking of writes by the updated CBT driver 228 begins. The ceasing of the tracking using the intermediate CBT driver 226 and the beginning of the tracking using the updated CBT driver 228 may be implemented by updating a function pointer, such as an I/O function pointer in the backup module 114, the OS APIs 212, or the file system driver 214. Alternatively, the tracking of writes by the updated CBT driver 228 may overlap with the tracking of writes by the intermediate CBT driver 226, resulting in the ceasing of tracking at step 428 happening sometime after the beginning of the tracking of writes by the updated CBT driver 228.

The method 400 of FIGS. 4A and 4B may include step 430 of unloading the intermediate CBT driver from the running operating system. For example, the backup module 114 may unload, at step 430, the intermediate CBT driver 226 from the running OS 200, as disclosed in FIG. 2. The unloading at step 430 may occur, for example, without rebooting or otherwise interrupting the I/O of the OS 200.

Therefore, the example method 400 disclosed herein may be employed to update the CBT driver 224 after having been loaded into the running OS 200 while reliably tracking incremental changes and without rebooting or otherwise interrupting the I/O of the OS 200, which avoids downtime of the OS 200 that would have resulted from a reboot or other interruption of the I/O of the OS 200. It is understood that the foregoing discussion of the method 400 is but one possible implementation of a method for live updating of a CBT driver, and various modifications are possible and contemplated. For example, the method 400 may be modified to remove one or more of steps 404, 408, 410, 418, 428, 430, 432, and 434.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" or "driver" may refer to software objects or routines that execute on a computing system. The different modules or drivers described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for live updating of a changed block tracking (CBT) driver, the method comprising:
   loading a CBT driver into a running operating system, the running operating system configured to prevent two drivers having the same name from being loaded simultaneously; and
   without rebooting the running operating system, performing the following:
      tracking, using the CBT driver, writes to blocks of a source storage;
      loading an updated CBT driver into the running operating system, the updated CBT driver having a different name than the CBT driver;
      handing over the tracking of writes to blocks of the source storage from the CBT driver to the updated CBT driver; and
      tracking, using the updated CBT driver, writes to blocks of the source storage.

2. The method of claim 1, wherein:
   the tracking, using the CBT driver, of writes to blocks of the source storage includes tracking, using the CBT driver, writes to blocks of the source storage in a first CBT map;
   the tracking, using the updated CBT driver, of writes to blocks of the source storage includes tracking, using the updated CBT driver, writes to blocks of the source storage in a second CBT map; and
   the handing over of the tracking of writes to blocks of the source storage from the CBT driver to the updated CBT driver includes copying the tracking included in the first CBT map to the second CBT map.

3. The method of claim 2, wherein:
   the first CBT map is a first run-length encoded (RLE) list; and
   the second CBT map is a second RLE list.

4. The method of claim 2, wherein a structure of the second CBT map is different than a structure of the first CBT map.

5. The method of claim 1, wherein the tracking, using the CBT driver, of writes to blocks of the source storage overlaps with the tracking, using the updated CBT driver, of writes to blocks of the source storage.

6. The method of claim 1, wherein the tracking, using the CBT driver, of writes to blocks of the source storage ceases once the tracking, using the updated CBT driver, of writes to blocks of the source storage begins.

7. The method of claim 6, wherein the ceasing of the tracking using the CBT driver and a beginning of the tracking using the updated CBT driver is implemented by updating a function pointer.

8. One or more non-transitory computer-readable media storing one or more programs that are configured, when executed, to cause one or more processors to perform the method as recited in claim 1.

9. A method for live updating of a changed block tracking (CBT) driver, the method comprising:
   loading a CBT driver into a running operating system, the running operating system configured to prevent two drivers having the same name from being loaded simultaneously; and
   without rebooting the running operating system, performing the following:
      tracking, using the CBT driver, writes to blocks of a source storage;
      loading an intermediate CBT driver into the running operating system, the intermediate CBT driver having a different name than the CBT driver;
      handing over the tracking of writes to blocks of the source storage from the CBT driver to the intermediate CBT driver;
      tracking, using the intermediate CBT driver, writes to blocks of the source storage;
      unloading the CBT driver from the running operating system;
      loading an updated CBT driver into the running operating system, the updated CBT driver having a different name than the intermediate CBT driver but the same name as the CBT driver;
      handing over the tracking of writes to blocks of the source storage from the intermediate CBT driver to the updated CBT driver; and
      tracking, using the updated CBT driver, writes to blocks of the source storage.

10. The method of claim 9, wherein:

the tracking, using the CBT driver, of writes to blocks of the source storage includes tracking, using the CBT driver, writes to blocks of the source storage in a first CBT map;

the tracking, using the intermediate CBT driver, of writes to blocks of the source storage includes tracking, using the intermediate CBT driver, writes to blocks of the source storage in a second CBT map; and the tracking, using the updated CBT driver, of writes to blocks of the source storage includes tracking, using the updated CBT driver, writes to blocks of the source storage in a third CBT map;

the handing over of the tracking of writes to blocks of the source storage from the CBT driver to the intermediate CBT driver includes copying the tracking included in the first CBT map to the second CBT map; and the handing over of the tracking of writes to blocks of the source storage from the intermediate CBT driver to the updated CBT driver includes copying the tracking included in the second CBT map to the third CBT map.

11. The method of claim 10, wherein:

the first CBT map is a first run-length encoded (RLE) list;

the second CBT map is a second RLE list; and the third CBT map is a third RLE list.

12. The method of claim 10, wherein a structure of the first CBT map is different than a structure of the third CBT map.

13. The method of claim 9, wherein:

the tracking, using the CBT driver, of writes to blocks of the source storage overlaps with the tracking, using the intermediate CBT driver, of writes to blocks of the source storage; and the tracking, using the intermediate CBT driver, of writes to blocks of the source storage overlaps with the tracking, using the updated CBT driver, of writes to blocks of the source storage.

14. The method of claim 9, wherein:

the tracking, using the CBT driver, of writes to blocks of the source storage ceases once the tracking, using the intermediate CBT driver, of writes to blocks of the source storage begins; and the tracking, using the intermediate CBT driver, of writes to blocks of the source storage ceases once the tracking, using the updated CBT driver, of writes to blocks of the source storage begins.

15. The method of claim 14, wherein:

the ceasing of the tracking using the CBT driver and a beginning of the tracking using the intermediate CBT driver is implemented by updating a function pointer; and the ceasing of the tracking using the intermediate CBT driver and a beginning of the tracking using the updated CBT driver is implemented by updating the function pointer.

16. One or more non-transitory computer-readable media storing one or more programs that are configured, when executed, to cause one or more processors to perform the method as recited in claim 9.

* * * * *